United States Patent [19]

Miyazaki et al.

[11] Patent Number: 5,895,713
[45] Date of Patent: Apr. 20, 1999

[54] METHOD FOR TREATING THE SURFACE OF AN OUTDOOR ARTICLE

[75] Inventors: Nobuyuki Miyazaki; Shun-ichi Kodama; Takashi Takayanagi; Bunji Uchino, all of Kawasaki, Japan

[73] Assignee: Asahi Glass Company Ltd., Tokyo, Japan

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/397,052

[22] PCT Filed: Jul. 14, 1994

[86] PCT No.: PCT/JP94/01156

§ 371 Date: Mar. 13, 1995

§ 102(e) Date: Mar. 13, 1995

[87] PCT Pub. No.: WO95/02462

PCT Pub. Date: Jan. 26, 1995

[30] Foreign Application Priority Data

| Jul. 14, 1993 | [JP] | Japan | 5-197017 |
| Aug. 25, 1993 | [JP] | Japan | 5-232516 |
| Mar. 11, 1994 | [JP] | Japan | 6-041463 |
| Apr. 28, 1994 | [JP] | Japan | 6-092205 |

[51] Int. Cl.$^6$ ............... B32B 27/08; B32B 27/18; B32B 27/28; B32B 31/12
[52] U.S. Cl. ............... 428/335; 428/421; 428/422; 428/446; 428/447; 524/261; 524/267; 524/269; 524/544; 524/545; 524/546; 106/287.1; 106/287.12; 427/372.2; 427/387; 427/393.5
[58] Field of Search ............... 428/421, 422, 428/447, 451, 216, 335, 446; 524/261, 267, 269, 412.4, 545, 544, 546, 520; 106/287.16, 287.12, 287.14, 287.13, 287.1; 427/387, 393.5, 372.2

[56] References Cited

U.S. PATENT DOCUMENTS

| 3,429,845 | 2/1969 | Bechtold et al. | 260/29.6 |
| 3,575,916 | 4/1971 | Bockstie, Jr. | 260/33.4 |
| 3,644,260 | 2/1972 | Strolle | 260/29.6 F |
| 4,028,300 | 6/1977 | Wake et al. | 260/31.2 R |
| 4,209,432 | 6/1980 | Roth | 260/29.2 M |
| 4,214,057 | 7/1980 | Ishihara et al. | 525/100 |
| 4,224,211 | 9/1980 | Kanazawa et al. | 260/31.2 R |
| 4,732,787 | 3/1988 | Vantillard et al. | 427/386 |
| 4,751,114 | 6/1988 | Homma et al. | 427/407.1 |
| 4,781,844 | 11/1988 | Kortmann et al. | 252/8.6 |
| 5,066,698 | 11/1991 | Hazan et al. | 524/269 |
| 5,169,915 | 12/1992 | Mohri et al. | 526/247 |
| 5,216,081 | 6/1993 | Mohri et al. | 525/199 |
| 5,314,731 | 5/1994 | Yoneda et al. | 428/429 |
| 5,399,601 | 3/1995 | Kusami et al. | 524/188 |
| 5,532,304 | 7/1996 | Miyazaki et al. | 524/261 |

*Primary Examiner*—Vivian Chen
*Attorney, Agent, or Firm*—Oblon, Spivak, McClelland, Maier & Neustadt, P.C.

[57] ABSTRACT

A method for treating an outdoor article, wherein a surface treating agent comprising a medium (B) containing a tetraalkoxysilane or a silane compound having a silanol group obtained by hydrolyzing an oligomer of such a tetraalkoxy silane (A), wherein the content of (A) is from 0.01 to 100 parts by weight per 100 parts by weight of (B), is used, and a thin film is formed by treating a hydrophobic synthetic resin coating film surface of the outdoor article with such a surface treating agent. It is thereby possible to prevent formation of a streak soils which are likely to form at a portion where rain water collects and runs down, such as below a window frame of a building.

8 Claims, No Drawings

METHOD FOR TREATING THE SURFACE OF AN OUTDOOR ARTICLE

This application is a 371 of PCT/JP94/01156, filed Jul. 14, 1994.

TECHNICAL FIELD

The present invention relates to a method for treating the surface of an outdoor article having a hydrophobic synthetic resin coating film surface, and an outdoor article having a thin film formed by such surface treatment.

BACKGROUND ART

Heretofore, it has been common to apply surface coating such as coating with a synthetic resin coating material to articles such as metals, inorganic materials, plastics, wood materials, papers, leathers or fibers to form a hydrophobic synthetic resin coating film on their surface for the purposes of their protection, imparting an artistic effect, imparting a functional property, etc.

Recently, as a coating material excellent in weather resistance, a fluoropolymer coating material is used in many cases. Such a fluoropolymer coating material shows a remarkably high weather resistance as compared with prior synthetic resin coating materials. However, soils deposited on its surface are of the same level as in the case of other synthetic resin coating materials, and an improvement in this respect is desired as a high performance commercial product.

Especially, with an article having a hydrophobic synthetic resin coating film, which is used outdoor (hereinafter referred to as an outdoor article), spot-like soils due to rain water are likely to form on the hydrophobic synthetic resin coating film surface exposed to rain. Further, streak-like soils (hereinafter referred to as rain streak soils) are likely to form at a portion where rain water collects and runs down, such as below a window frame of a building. Such rain streak soils can easily be removed by cleaning. However, not only repeated cleaning is cumbersome, but also the cleaning operation is not easy in the case of a large size outdoor article such as a building. Accordingly, a coated outdoor article is desired which has a surface less susceptible to formation of rain streak soils.

Heretofore, to solve the formation of the soils on the surface of a coated article, a composition for a coating material has been proposed wherein a polymer having a polyfluorinated carbon chain and a hydrophilic group, is incorporated (Japanese Unexamined Patent Publication No. 198653/1989). However, the coating surface obtained by this composition for a coating material was not adequate with respect to the point of preventing formation of rain streak soils, although some effects for suppressing formation of spot-like soils due to rain water are observed.

The present inventors have found a surface treating agent which is effective particularly for preventing formation of rain streak soils on the surface of an outdoor article having a hydrophobic synthetic resin coating film surface. The present invention provides a method for treating the surface of the above mentioned outdoor article by means of such a surface treating agent and an outdoor article having the surface treated by such a method.

DISCLOSURE OF INVENTION

The present invention is the following invention which has been made to solve the above described problems.

A method for treating the surface of an outdoor article, which is characterized by treating the coating film surface of an outdoor article having a hydrophobic synthetic resin coating film, by means of a surface treating agent having a silane compound (A) having a silanol group obtained by hydrolyzing a tetrafunctional hydrolyzable silane compound or an oligomer of the tetrafunctional hydrolyzable silane compound, or such a silane compound (A) and a synthetic resin film-forming component (C), dissolved or dispersed in a medium (B), wherein the content of the silane compound (A) is from 0.01 to 100 parts by weight per 100 parts by weight of the medium (B).

An outdoor article having a thin film formed from a surface treating agent containing the following silane compound (A), or the following silane compound (A) and a synthetic resin film-forming component (C), on the coating film surface of the outdoor article having a hydrophobic synthetic resin coating film, wherein the silane compound (A) is a silane compound having a silanol group obtained by hydrolyzing a tetrafunctional hydrolyzable silane compound or an oligomer of the tetrafunctional hydrolyzable silane compound.

The surface treating method of the present invention is applied to the surface portion of a hydrophobic synthetic resin coating film of an outdoor article coated with a hydrophobic synthetic resin, where rain streak soils are particularly likely to form. The thin film formed by this surface treatment is capable of preventing formation of rain streak soils excellently for a long period of time.

In the silane compound (A) having a silanol group obtained by hydrolyzing a tetrafunctional hydrolyzable silane compound or an oligomer of the tetrafunctional hydrolyzable silane compound (hereinafter referred to simply as a silane compound (A), the tetrafunctional hydrolyzable silane compound is a silane compound having four hydrolyzable groups bonded to a silicon atom. The four hydrolyzable groups may be different, but they are usually the same hydrolyzable groups. The hydrolyzable groups include, for example, alkoxy groups, alkoxyalkoxy groups, acryloxy groups, aryloxy groups, aminoxy groups, amide groups, ketoxim groups, isocyanate groups and halogen atoms. Particularly preferred are groups having hydrogen atoms removed from hydroxyl groups of monohydric alcohols, such as alkoxy groups or alkoxyalkoxy groups. Most preferred hydrolyzable groups are alkoxy groups, and their carbon number is preferably at most 4, particularly preferably 1 or 2.

As mentioned above, a preferred tetrafunctional hydrolyzable silane compound in the present invention is a tetraalkoxysilane, such as tetramethoxysilane, tetraethoxysilane, tetrapropoxysilane or tetrabutoxysilane. Particularly preferred is tetramethoxysilane or tetraethoxysilane.

The oligomer of the tetrafunctional hydrolyzable silane compound is an oligomer formed by condensation of at least two molecules of tetrafunctional hydrolyzable silane compounds by the reaction of silanol groups formed by the hydrolysis of the tetrafunctional hydrolyzable silane compound. The number of condensed molecules of the tetrafunctional hydrolyzable silane compound will hereinafter be referred to as an oligomerization degree of the oligomer. The oligomerization degree also represents the number of silicone atoms in one molecule of the oligomer. If the oligomerization degree of the oligomer used in the present invention is too large, the oligomer tends to be highly viscous, whereby its handling becomes difficult, and the solubility in a medium will be too low, and further it tends to form a gel in the surface treating agent. Accordingly, it is usually at most 10, preferably at most 8.

The oligomer of the tetrafunctional hydrolyzable silane compound is considered usually to have a linear molecular structure in many cases. However, it is considered that ones having cyclic, branched and network molecular structures are also present. The oligomer to be used in the present invention may not only be the one having such a linear molecular structure but also the one having other molecular structure. Hereinafter, the oligomer will be described as the one having a linear molecular structure, but the useful oligomer is not limited thereto.

The tetraalkoxysilane and its oligomer (the one having a linear molecular structure) can be represented by $RO\{Si(OR)_2O\}_nR$. R is an alkyl group, and n represents the oligomerization degree. In a tetraalkoxy silane, n is 1, and in the oligomer, n is an integer of at least 2. An oligomer commonly available is a mixture of oligomers having different n, and the oligomerization degree is represented by the averaged n.

The degree of oligomerization of a tetrafunctional hydrolyzable silane compound such as a tetraalkoxysilane or its oligomer, may sometimes be represented by a "silica content". The "silica content" is a weight ratio of silica ($SiO_2$) formed from the compound, which is obtained by completely hydrolyzing and calcined the compound and measuring the amount of the resulting silica. Further, the "silica content" also represents the proportion of silica formed from one molecule of the compound, per molecule of the compound, and it is a value calculated by the formula [silica content (wt %)=oligomerization degree×(molecular weight of $SiO_2$)×100/(molecular weight of the compound)]. It is possible to prevent formation of rain streak soils over a long period of time by adjusting the silica content of the oligomer of a tetramethoxysilane to a level of at least 40 wt % or adjusting the silica content of the oligomer other than the oligomer of tetramethoxysilane to a level of at least 35 wt %.

The tetraalkoxysilane or its oligomer may be the one which is commercially available. As the oligomer, so-called methyl silicate 51, ethyl silicate 40 or ethyl silicate 48 may, for example, be mentioned. Te number in such a tradename is reported to represent the silica content. For example, methyl silicate 51 is an oligomer of tetramethoxysilane having a silica content of 51 wt %.

The silane compound A in the present invention is the one obtained by hydrolyzing the above-mentioned tetrafunctional hydrolyzable silane compound or its oligomer. By hydrolysis of the hydrolyzable silane compound, a silanol group will form. However, in a usual case, a condensation reaction due to the formed silanol group is likely to take place at the same time. Accordingly, in a case where such a condensation reaction is likely to take place, it is preferred to use the surface treating agent in a short period of time after conducting the hydrolysis, from the viewpoint of the pot life. It is of course possible to use the one less susceptible to such a condensation reaction or having the condensation reaction suppressed. For example, it is possible to employ a hydrolyzed oligomer of a tetraalkoxysilane containing no or little water or catalyst for hydrolysis.

The hydrolysis reaction is usually conducted by adding water and a catalyst for hydrolysis to the tetrafunctional hydrolyzable silane compound or its oligomer, followed by stirring. This hydrolysis may be carried out in the presence of an alcohol such as ethanol or isopropyl alcohol. Further, if necessary, heating or cooling may be applied. The catalyst for hydrolysis includes an acid catalyst and a base catalyst. In many cases, an acid catalyst is used. A base catalyst has a function to promote the condensation reaction and therefore is not regarded as a desirable catalyst in the present invention. As the acid catalyst, any acid catalyst known to be a catalyst for hydrolysis can be used without any particular restriction. For example, an inorganic acid such as hydrochloric acid, nitric acid or sulfuric acid, or an organic acid such as acetic acid or p-toluenesulfonic acid may be mentioned. It is particularly preferred to use an inorganic acid such as hydrochloric acid.

As the silane compound A in the present invention, the one obtained by hydrolyzing an oligomer of a tetraalkoxysilane is most preferred. The oligomerization degree of the oligomer is preferably from 2 to 10, particularly preferably from 2 to 8. The one having an oligomerization degree which is too high, is not desirable for the above mentioned reasons that the solubility in a medium such as water is low, the viscosity of a solution as dissolved in a medium is high, and the intended effect for preventing formation of rain streak soils are low. On the other hand, the one having an oligomerization degree of 1 i.e. a tetraalkoxysilane alone has a difficulty in its handling for such reason that the condensation reaction tends to be excessive at the time of the hydrolysis, and it tends to be gelled. Yet, it is thereby difficult to adequately attain the desired effects for preventing formation of rain streak soils. As an oligomer of a tetraalkoxysilane, an oligomer of tetramethoxysilane or an oligomer of tetraethoxysilane is preferred. Between them, an oligomer of tetraethoxysilane which is capable of providing the effects even with a small amount and capable of providing excellent effects for preventing formation of rain streak soils without bringing about deterioration of other coating film properties, is preferred.

The surface treating agent in the present invention is preferably the one having the silane compound A dissolved or dispersed in the medium (B). Particularly preferred is the one in the form of a uniform solution, so that a uniform thin film can be formed (by surface treatment). Further, an aqueous medium is preferred for reasons of operational stability, environmental preservation, etc. However, a non-aqueous medium may also be used. The aqueous medium is basically preferably composed thoroughly of water or a mixed medium of water with a water-soluble organic solvent. Even when the medium is composed thoroughly of water, if hydrolysis is conducted in the aqueous medium to produce the silane compound A, a by-product formed by the hydrolysis, such as an alcohol, will be mixed thereto to form a mixed medium. As the medium in the present invention, the one containing such as a by-product medium, may be employed.

As the water-soluble organic solvent, a water-soluble alcohol such as ethanol, isopropanol, n-butanol, ethylene glycol monoethylether, diethylene glycol monoethyl ether or diacetone alcohol is preferred, and one or more of them may be used. As such an organic solvent, a water-soluble organic solvent having a boiling point of not higher than 200° C., particularly not higher than 110° C., is preferred. The one of which boiling point is too high, is not desirable, since it tends to remain in the thin film formed by the surface treatment. Further, for the purpose of facilitating evaporation of water, a solvent azeotropic with water, such as aceton, ethanol or isopropyl alcohol can be used.

As the non-aqueous medium, the above-mentioned alcohol such as ethanol, isopropanol or n-butanol, a ketone such as methyl ethyl ketone or methyl isobutyl ketone, an ester such as butyl acetate or ethyl acetate, an aromatic solvent such as xylene or toluene, an aliphatic solvent, an ether solvent or a petroleum solvent may, for example, be used. As such a non-aqueous medium, a polar solvent such as an alcohol, a ketone or an ester is preferred. Among non-aqueous media, alcohols may, for example, be used with a small amount of water incorporated for hydrolysis. Such non-aqueous media may be used alone or as mixture of two or more of them.

The content of the silane compound A in the surface treating agent is preferably from 0.01 to 100 parts by weight, more preferably from 0.1 to 10 parts by weight, per 100 parts by weight of the medium (B). If the amount of the silane compound A is too small, a large amount of the treating agent is required to be used to accomplish the desired effects as a surface treating agent, whereby the coating properties tend to be poor, such being undesirable. On the other hand, if it is too large, the resulting thin film tends to be too thick or brittle and is likely to undergo cracking, such being undesirable. Further, the silane compound A may be used, as diluted with a non-aqueous medium, whereby an effect of improving the storage stability can be obtained.

As the non-aqueous medium, the above-mentioned one may be used without any particular restriction. Particularly preferred is an alcohol. In a case where two or more non-aqueous media are used in combination, at least one of them is preferably an alcohol. The amount of the alcohol to be used is preferably at least equivalent, particularly at least two equivalents, to the silane compound A.

The film thickness of the thin film formed from the surface treating agent is preferably from 0.01 to 50 μm, more preferably from 0.1 to 30 μm. Since a thin film formed from a surface treating agent using no or little amount of the following synthetic resin film-forming component (C) is likely to be brittle, the film thickness is preferably from 0.1 to 10 μm.

When the synthetic resin film-forming component (C) (hereinafter referred to simply as film-forming component (C) is incorporated into the surface treating agent in an amount of from 0.01 to 100 parts by weight, preferably from 0.1 to 10 parts by weight, per 1 part by weight of the silane compound A, the film-forming properties of the surface treating agent will be good, and a tough thin film will be formed. Further, the adhesion to the hydrophobic synthetic resin coating film will be improved.

As the film-forming component, various resins used for coating materials, such as a fluoropolymer, an acrylic resin, an acryl silicone resin, a polyester resin, an alkyd resin and an epoxy resin, may be employed. These resins may be used in combination as a mixture of two or more of them. As such a resin, a so-called fluoropolymer for coating material, which is used for coating materials, is particularly preferred from the viewpoint of weather resistance. Especially when the hydrophobic synthetic resin coating film on the outdoor article is a coating film of a fluoropolymer coating material, it is particularly preferred from the viewpoint of the adhesion to the coating film.

As the fluoropolymer for coating material, a resin made of a polymer of at least one fluoroolefin or a copolymer obtained by copolymerizing a fluoroolefin with an other copolymerizable monomer, is preferred from the viewpoint of the solubility in a solvent, the weather resistance of the coating film of the surface treating agent, the operation efficiency for coating the surface treating agent, the film-forming property of the surface treating agent, etc. Further, various solvent-soluble fluoropolymers for coating material, such as fluoropolymers for coating material made of poly-mers or copolymers of vinylidene fluoride, may be employed. Hereinafter, description will be made mainly with respect to a fluoropolymer for coating material made of a fluoroolefin copolymer.

As the fluoroolefin, a fluoroolefin having 2 or 3 carbon atoms, such as tetrafluoroethylene, chlorotrifluoroethylene, trifluoroethylene, vinylidene fluoride, hexafluoropropylene or pentafluoropropylene, may be mentioned. Particularly preferred is tetrafluoroethylene or chlorotrifluoroethylene. The fluoroolefin copolymer may be a copolymer of two or more fluoroolefins, such as a vinylidene fluoride/tetrafluoroethylene/hexafluoropropylene copolymer. However, preferred is a copolymer obtained by copolymerizing a fluoroolefin with a copolymerizable monomer other than a fluoroolefin.

As the monomer copolymerizable with the fluoroolefin, a monomer such as a vinyl ether, a vinyl ester, an allyl ether, an allyl ester, an isopropenyl ether, an isopropenyl ester, a methallyl ether, a methallyl ester, an α-olefin, an acrylic acid ester, or a methacrylic acid ester, may, for example, be mentioned. These monomers maybe used in combination as a mixture of two or more of them.

Here, the vinyl ether is preferably an alkyl vinyl ether such as ethyl vinyl ether, butyl vinyl ether, cyclohexyl vinyl ether, a (fluoroalkyl) vinyl ether or a perfluoro(alkyl) vinyl ether). The vinyl ester is preferably a fatty acid vinyl ester such as "Veova 10" (tradename, Shell Chemical Co.,) having a branched alkyl group, vinyl pivalate, versatic acid vinyl ester, vinyl butyrate or vinyl acetate.

Further, the allyl ether is preferably an alkyl allyl ether such as ethyl allyl ether or cyclohexyl allyl ether, and the allyl ester is preferably a fatty acid allyl ester such as allyl propionate or allyl acetate. The isopropenyl ether is preferably an alkyl isopropenyl ether such as methyl isopropenyl ether, and the α-olefin is preferably ethylene, propylene or isobutylene.

If the copolymerized proportion of the fluoroolefin is too low, no adequate function as a film-forming component for weather resistance can be obtained. On the other hand, if the copolymerized proportion of the fluoroolefin is too high, the solubility in a solvent tends to be low, such being undesirable. Accordingly, preferred is a fluoropolymer in which a fluoroolefin is copolymerized in a proportion of from 30 to 70 mol %, more preferably from 40 to 60 mol %, to the total monomer.

Among the above-mentioned monomers copolymerized with the fluoroolefin, a vinyl ether, a vinyl ester, an allyl ether and allyl ester are particularly preferred, since they are excellent in the copolymerizability with the fluoroolefin. Further, an alkyl vinyl ether having a $C_{1-10}$ linear or branched or alicyclic alkyl group, a fatty acid vinyl ester, an alkyl allyl ether and a fatty acid allyl ester are preferred.

The fluoropolymer for coating material may have a functional group crosslinkable by a reaction with a curing agent, in addition to the above-described copolymer component. By crosslinking this fluoropolymer having such a functional group by the reaction with a curing agent, it is possible to obtain a tough coating film. As such a functional group, an active hydrogen-containing group reactive with an isocyanate type curing agent or an aminoplast type curing agent, such as a hydroxyl group, an amino group, an acid amide group or a carboxylic acid group, may, for example, be mentioned. In addition to such groups, a functional group such as an epoxy group, a halogen or a double bond may also be mentioned.

As a method for introducing such a functional group, a method may be mentioned in which a monomer having a functional group, such as hydroxybutyl vinyl ether, hydroxybutyl allyl ether, ethylene glycol monoallyl ether, cyclohexanediol monovinyl ether, acrylic acid, methacrylic acid, crotonic acid, undecenoic acid, glycidyl vinyl ether or glycidyl allyl ether, is copolymerized.

Otherwise, it is possible to use a method of introducing the functional group by modifying the copolymer such as a method of introducing a carboxylic acid group by reacting a polybasic acid anhydride such as succinic anhydride with a hydroxyl group or an epoxy group, or a method of introducing a double bond by reacting an isocyanate alkylmethacrylate. The copolymer unit having the functional group is preferably from 5 to 20 mol % to the total copolymer units in the copolymer.

Even if the fluoropolymer as the film-forming component C is the one having a functional group, it is not necessarily required to use it in combination with a curing agent i.e. a component crosslinking the functional group. A curing agent, particularly a curing agent such as a polyvalent isocyanate compound, readily reacts with other components in the surface treating agent, such as an alcohol, water and the silane compound A. Therefore, in many cases, it will be difficult to preliminarily incorporate it in the surface treating agent. On the other hand, even if the fluoropolymer has a functional group, it provides adequate effects as a film-forming component C without using a curing agent in combination. Further, a fluoropolymer having a functional group such as a hydroxyl group or a carboxylic acid group has a high solubility in a polar solvent such as an alcohol. For this reason only, it is preferred to use a fluoropolymer having a functional group even when a curing agent is not used.

As such a fluoropolymer, commercial products such as Lumiflon (Asahi Glass Company Ltd.), Cefralcoat (Central Glass Co., Ltd.), Zaflon (Toagosei Chemical Industry Co. Ltd.), Zefful (Daikin Industries, Ltd), Fluonate (Dainippon Ink and Chemicals, Inc.), Fluolene (Japan Synthetic Rubber Co., Ltd.) and Kynar (Atochem) may be used.

Further, as the hydrophobic synthetic resin coating film which the outdoor article has as described hereinafter, a coating film formed by coating a fluoropolymer coating material is most preferred. As such a fluoropolymer for a fluoropolymer coating material, the above-mentioned resin can be used. In such a case, the fluoropolymer having a functional group is usually used in combination with a curing agent. With respect to the curing agent, additives, etc. for the fluoropolymer coating material to be used for forming the hydrophobic synthetic resin coating film, a description will be made hereinafter at the same time as the description concerning the fluoropolymer as the film-forming component C. Accordingly, the following description of e.g. a curing agent is not necessarily essential for the film-forming component C.

As the curing agent, any curing agent may be used without any particular restriction so long as it is capable of crosslinking the fluoropolymer by a reaction with the functional group of the fluoropolymer. For example, as a curing agent used for the fluoropolymer having a hydroxyl group, an aminoplast type curing agent, an isocyanate type curing agent, a polybasic acid type curing agent or a polyvalent amine type curing agent may, for example, be mentioned.

As the aminoplast type curing agent, a methylolmelamine, a methylolguanamine or a methylol urea may, for example, be used. As the methylolmelamine, a methylolmelamine etherified with a lower alcohol, such as butylated methylolmelamine or methylated methylolmelamine or an epoxy modified methylolmelamine may, for example, be use. As the methylol urea, an alkylated methylol urea such as a methylated methylol urea or an ethylated methylol urea, may, for example, be used. When an aminoplast type curing agent is used, it is common to employ an acid catalyst to promote the crosslinking reaction.

As the isocyanate type curing agent, a polyvalent isocyanate compound or its blocked product may be mentioned. The polyvalent isocyanate compound is compound having at least two isocyanate groups, and it may be a compound having at least two isocyanate groups made of its modified product or oligomer.

As the polyvalent isocyanate compound, an aliphatic polyvalent isocyanate compound such as tetramethylene diisocyanate, hexamethylene diisocyanate, hexamethylene triisocyanate or lysine diisocyanate, an alicyclic polyvalent isocyanate compound such as isophorone diisocyanate, dicyclohexylmethane diisocyanate or diisocyanate methylcyclohexane, and a non-yellowing aromatic polyvalent isocyanate compound such as xylylene diisocyanate may be used.

As the modified product or oligomer of the polyvalent isocyanate compound, those which are called an urethane modified product, a urea modified product, an isocyanurate modified product, a biuret modified product, an allophanate modified product and a carbodiimide modified product, may, for example, be mentioned. Particularly preferred is, for example, an isocyanurate modified product which is a trimer, or a urethane modified product which is a reaction product with a polyhydric alcohol such as trimethylolpropane.

A coating composition using an isocyanate type curing agent having a free isocyanate group is capable of being cured at room temperature. It is almost an essential curing agent for coating at site. The isocyanate type curing agent having a blocked isocyanate group usually makes a heat setting type coating composition like other curing agents. When an isocyanate type curing agent is used, a urethane-modifying catalyst such as dibutyltin dilaurate is usually employed.

When a curing agent is required for a fluoropolymer coating material to form the hydrophobic synthetic resin coating film, the amount of the curing agent incorporated, is preferably from 0.1 to 100 parts by weight, particularly from 1 to 50 parts by weight, per 100 parts by weight of the fluoropolymer.

If the surface treating agent in the present invention is alkaline as mentioned above, condensation of the silane compound A will be promoted, whereby the storage stability of the surface treating agent tends to be poor. Accordingly, its pH is preferably at most 7. Particularly from the viewpoint of the storage stability, the pH is preferably at a level of from 3 to 4. For this purpose, it is preferred to use an acid catalyst for hydrolysis, as mentioned above. Further, it is preferred to use a buffer together with the acid catalyst to stabilize the pH. As the buffer, a weak acid such as acetic acid or carbonic acid, or a salt thereof is preferred. The buffer itself may sometimes has an effect as a catalyst of hydrolysis. The total amount of such an acid catalyst or buffer (D) is preferably from 0.001 to 100 parts by weight, particularly from 0.01 to 10 parts by weight, per 100 parts by weight of the medium (B).

When an aqueous medium is used in the present invention, it is preferred to use a surfactant (E) together. By incorporating the surfactant, it is possible to prevent formation of cissing when the surface treating agent is applied on the hydrophobic synthetic resin coating film and thereby to form a uniform thin film. The amount of the surfactant (E) is suitably selected depending upon the type of the surfactant and the type of the hydrophobic synthetic resin coating film. However, the amount is usually from 0.001 to 100 parts by weight, preferably from 0.01 to 10 parts by weight, per 100 parts by weight of the aqueous medium. It is particularly preferred to adjust the amount and the type so that the surface tension of the surface treating agent would be at most 30 dyn/cm$^2$, particularly at most 20 dyn/cm$^2$.

The type of the surfactant is not particularly limited, but a nonionic type is preferred. A fluorine type surfactant which provides a high surface active effect in a small amount, is particularly preferred. As the fluorine type surfactant, a fluorine type surfactant of e.g. a perfluoroalkyl group-containing alkyl ether type, an alkyl ester type, a polyoxyethylene alkylamine type or a polyoxyethylene alkylamide type, is preferred.

It is also preferred to incorporate a silane coupling agent to the surface treating agent in the present invention in order to improve the adhesion to the hydrophobic synthetic resin coating film on the surface of the outdoor article. In the present invention, the silane coupling agent means a silane compound having a hydrolyzable group as described above and an organic group other than the hydrolyzable group. The organic group other than the hydrolyzable group is bonded to a silicon atom at the terminal carbon atom. Such an organic group may be a hydrocarbon group having no functional group. However, it is preferred that at least one organic group has a functional group. As the hydrolyzable group bonded to the silicon atom, an alkoxy group is particularly preferred, but an isocyanate group is also preferred. Particularly preferred is a silane compound having two or three alkoxy groups.

In the above silane coupling agent, as the organic group other than the hydrolyzable group, it is common that one organic group having a functional group is present, and when an other organic group is present, such a group is usually an organic group having no functional group, such as an alkyl group. As the functional group in the organic group having a functional group, an amino group, an epoxy group, a mercapto group or an isocyanate group may, for example, be mentioned. Particularly preferred is a silane coupling agent having an amino group or an epoxy group, since the adhesion can thereby be improved even by an addition of a small amount of the silane coupling agent.

The amount of the silane coupling agent to be incorporated is suitably from 1 to 50 parts by weight, preferably from 5 to 30 parts by weight, per 100 parts by weight of the silane compound A or per 100 parts by weight of the total amount of the silane compound A and the film-forming component C.

The silane coupling agent is used as incorporated in the surface treating agent. Otherwise, it is possible to adopt a method wherein it is applied as a primer preliminarily on the hydrophobic synthetic resin coating film on the surface of the outdoor article. In such a case, the silane coupling agent may directly be coated or may be dissolved in a suitable solvent such as an alcohol or water and then coated. Then, the surface treating agent is applied on this primer.

Other than the silane coupling agent, other compounds capable of providing similar effects can be used. The silane coupling agent and other adhesion-improving agents include, for example, the following compounds.

Methyltrimethoxy silane, dimethylvinylmethoxysilane, 3-glycidoxypropyltrimethoxysilane, γ-aminopropyltriethoxysilane, vinyltriethyoxysilane, γ-mercaptopropyltrimethoxysilane, γ-methacryloxypropyltrimethoxysilane, γ-isocyanatepropyltrimethoxysilane, methylsilyl triisocyanate, vinylsilyl triisocyanate, diethoxysilyl diisocyanate, dimethyldichlorosilane, trimethylchorosilane, chloromethyldimethylsilane, methyltrichlorosilane, chloromethyldimethylvinylsilane, hexamethylsilazane, cyclic silazane, N',N'-bis(trimethylsilyl)trifluoroacetamide, N-trimethylsilylacetamide, N-trimethylsilylphenylurea, bistrimethylsilylurea, dimethyltrimethylsilylamine, trimethylsilylimidazole, trimethylsilyldimethylamine, methyltriacetoxysilane, 1,3-bis(γ-aminopropyl)-1,1,3,3-tetramethyldisiloxane, 3-glycidoxypropyltrimethoxysilane, 3-glycidoxypropylmethyldimethoxysilane, 3-glycidoxypropyl methyldiethoxysilane, 2-(3,4-epoxycyclohexyl)ethyltrimethoxysilane and $CH_3Si$ [ON=C$(CH_3)(C_2H_5)$]$_3$.

As commercial products, TSL 8000 series, TSL 8100 series, TSL 8300 series, TSL 9306, TSL 88 series, XC 95 series and XC 99 series, manufactured by Toshiba silicone KK, KMB 1000 series, KBE 1000 series, KBC 100 series, KBM 400, 500, 600, 700, 800 and 900 series, X-12 series, KBP 503 series, manufactured by Shin-Etsu Chemical Co. Ltd., AZ series and A series, manufactured by Nippon Unicar Co. Ltd., and silane coupling agent A series of Union Carbide, may, for example, be mentioned.

Preferred silane coupling agents include amino group-containing silane coupling agents such as γ-aminopropyltriethyoxysilane, γ-aminopropyltrimethoxysilane, γ-aminopropylmethyldimethoxysilane, N-(2-aminoethyl)-γ-aminopropyltriethoxysilane, N-(2-aminoethyl)-γ-aminopropyltrimethoxysilane and N-(2-aminoethyl)-γ-aminopropylmethyldimethoxysilane and epoxy group-containing silane coupling agents such as 3-glycidoxypropyltrimethoxysilane, 3-glycidoxypropylmethyldimethoxysilane, 3-glycideoxypropylmethyldiethoxysilane and 2-(3,4-epoxycyclohexyl)ethyltrimethoxysilane.

In the present invention, the silane compound A is considered to further undergo hydrolysis or condensation in the vicinity of the surface of the thin film formed by the surface treating agent on the surface of the hydrophobic synthetic resin coating film. A catalyst to promote this reaction may be incorporated to the surface treating agent. As such a catalyst, a metal compound catalyst such as a metal chelate, a metal ester or a metal alkoxide may be mentioned. As the metal component of such a catalyst, aluminum, titanium, silicon, tin or zinc may, for example, be mentioned. Specifically, a metal compound catalyst such as aluminum monoacetylacetonate bis(ethylacetoacetate), or an aluminum tris(acetylacetonate) may be mentioned. Its amount is suitably from 0.1 to 20 parts by weight, preferably from 1 to 10 parts by weight, per 100 parts by weight of the silane compound A.

The surface treating agent in the present invention may contain, in addition to the above described components, a pigment, an ultraviolet absorber, a photostabilizer, a leveling agent, a delustering agent, etc. However, the thin film formed by the surface treating agent is preferably a transparent thin film. Accordingly, it is usually preferred not to use a component hindering the transparency such as a pigment. It is of course possible to use such an additive which may hinder the transparency, such as a pigment to such an extent not to impair the transparency.

The surface treating agent in the present invention may be applied by means of a conventional coating method to readily form a uniform thin film. The coating method is not particularly limited, and brush coating, roller coating, pad application, spray coating, spin coating or flow coating may, for example, be employed. After the coating, the thin film can be formed simply by drying at room temperature. However, in some cases, compulsive drying may be carried out.

The surface treating agent in the present invention is used to prevent formation of rain streak soils on the surface of the coating film made of a hydrophobic synthetic resin coated on an outdoor article. The rain streak soils are likely to form on a hydrophobic surface and tend to hardly form on the surface of a thin film formed by this surface treating agent. Accordingly, in the present invention, the surface treating agent is applied to a portion of the outdoor article coated with a hydrophobic synthetic resin, which is exposed to rain or a portion where rain water runs down. Of course, it may also be applied at its peripheral portion.

As the synthetic resin forming the hydrophobic synthetic resin coating film, various hydrophobic resins used for coating materials, such as a fluoropolymer, an acrylic resin, an acryl silicone resin, a polyester resin, an alkyd resin and an epoxy resin, may be mentioned. These resins may be used as a mixture of two or more of them. As the hydrophobic synthetic resin coating film, a coating film formed by a fluoropolymer coating material has a high necessity for application of the present invention, since the hydrophobic nature is particularly high, and rain streak soils are likely to form. A synthetic resin coating film formed by a coating material other than the fluoropolymer coating material is likely to deteriorate, whereby a thin film formed by the treating agent on its surface is likely to peel, and the effects by the surface treatment are likely to be lost. On the other hand, a fluoropolymer coating film is less likely to undergo such deterioration, and it satisfies the object of the present invention and provides adequate effects.

As the fluoropolymer coating material, a fluoropolymer which is used for the above-mentioned film-forming component, may be used. It is preferred to employ a fluoropolymer coating material comprising a fluoropolymer having a functional group and a curing agent as the essential components, since it is thereby possible to obtain a tougher coating film on the surface of the hydrophobic synthetic resin coating film. Further, the fluoropolymer coating material may be other types of fluoropolymer coating material.

The present inventors believe that the effects to prevent formation of rain streak soils by the thin film formed by the surface treating agent is basically attributable to the hydrophilic nature and the oil repellency of the thin film surface. Oily soils in rain water will deposit along the run of rain water on the hydrophobic surface and will remain as streak soils upon drying. On the other hand, oily soils will not spread on the hydrophilic and oil repellent surface. Accordingly, the contact area between the surface and the oily soils will be narrow. Accordingly, adhesion of oily soils to the surface will be low, and oily soils tend to throw down together with the run of rain water.

The degrees of the hydrophobicity and the hydrophilicity of the surface can be measured by measuring the octane contact angle in water. The larger the octane contact angle in water, the higher the hydrophilicity of the surface and the higher the oil repellency. The present inventors have found that to adequately prevent formation of rain streak soils, the octane contact angle in water is preferably at least 102°. The above described surface treating agent in the present invention is the one whereby the octane contact angle in water of a thin film thereby formed will be at least 102°.

The present inventors have further found that there is an interrelation between the advance tension of the surface and likeliness of formation of rain streak soils, like the case of the octane contact angle. Namely, when the advance tension of the surface is smaller than 0 dyn/cm, rain streak soils are likely to form, and when it is larger than this, rain streak soils tend to hardly form. Accordingly, in order to prevent formation of rain streak soils on the surface of the coated outdoor article, it is preferred that the advance tension of the surface of the thin film formed by the surface treating agent is at least 0 dyn/cm. A thin film having such an advance tension is excellent in the effects for preventing rain streak soils.

The advance tension of the surface is a tension per unit peripheral length, when a sample having a thin film formed by the surface treating agent is in contact with the water surface when it is immersed in distilled water. It is distinguished from a retreating tension which is a tension per unit peripheral length when the sample departs from the water surface when it is withdrawn from distilled water.

This advance tension can be measured by means of a dynamic contact angle measuring apparatus. Further, the advance tension is difficult to directly measure and therefore is obtained in such a manner that while immersing the sample in distilled water at 25° C. at a constant speed, measurement of the change in weight of the sample is carried out until the weight change (dyn) will become constant, and the linear line of this weight change is extrapolated to the point when the sample has contacted the water surface to determine the weight change at the time when the sample has contacted the water surface, which is divided by a unit peripheral length (cm) of the sample to obtain a value of the advance tension. The present inventors have adopted a value obtained by measuring at an immersion speed of 20 mm/min. as the advance tension.

The material for the substrate constituting the outdoor article is not limited. For example, it may be an inorganic material such as concrete, ALC (light weight foamed concrete), GRC (glass fiber reinforced concrete), CFRC (carbon fiber reinforced concrete), stone, slate or glass, a resin such as an acrylic resin, a polycarbonate resin, a vinyl chloride resin or a polyethyrene resin, a synthetic organic material such as rubber, a natural organic material such as wood, a metal material such as aluminum, copper, brass, titanium, iron, stainless steel, a zinc steel plate or a steel plate, or an organic-inorganic composite material such as FRP (glass fiber-reinforced synthetic resin) or CFRP (carbon fiber-reinforced synthetic resin).

Further, the outdoor article in the present invention is an outdoor article having a portion where rain streak soils are likely to form. For example, it may be a transportation equipment such as an automobile, an electric car, a helicopter, a ship, a bicycle, a snow mobile, a ropeway, a lift, a hovercraft or a motorcycle, a building part such as a sash, a shutter, a water storage tank, a door, a balcony, an external panel for building, a roof material, a staircase, a sky light or a concrete fence, an outer wall of an architectural structure such as a building or a house, a road part such as a guardrail, a foot bridge, a sound insulating wall, a road sign, a high way road side wall, a railway bridge or a bridge, a plant equipment such as a tank, a pipe, a tower or a chimney, an agricultural equipment such as a vinyl house, a green house, a silo or an agricultural sheet, a communication installation such as a utility pole, a power transmission tower or a parabola antenna, an electrical equipment such as distributing box, an illuminating equipment, an exterior part of an air conditioner or a washing machine, as well as a covering material, a monument, a grave stone, a paving material, a wind shield sheet, a waterproof sheet and a cultivation sheet for building, etc.

It is particularly preferred to apply the present invention to a coated surface of the exterior surface of fixed architectural structure such as building or a house and a fixed structure such as an iron tower or a bridge. Many of such fixed structures have surfaces on which rain water runs down, and if such surfaces are highly hydrophobic coated surfaces, rain streak soils are likely to form. Besides, such fixed structures are large-sized in many cases, and repeated cleaning is cumbersome and highly costly. It is most preferred to apply the present invention to such fixed structures.

Now, the present invention will be described in further detail with reference to Examples and Comparative Examples. However, the present invention is not limited to such Examples. In the following Examples "parts" representing the amount of use means parts by weight unless otherwise specified.

BEST MODE FOR CARRYING OUT THE INVENTION

Surface Treating Agent Preparation Example 1

10 parts of 0.01N hydrochloric acid was mixed with 20 parts of ethyl silicate 40 |a tetraethoxysilane oligomer (average oligomerization degree: about 5) manufactured by Colcoat Co. Ltd., which contains no silanol group|, and the mixture was subjected to a hydrolysis reaction at 60° C. for one hour to obtain a uniform solution containing a silane compound having a silanol group. To this solution, 950 parts of water, 0.5 part of acetic acid and 0.01 part of a fluorine type surfactant $C_8F_{17}CONH(C_2H_4O)_{15}CH_3$ were added and stirred to obtain a uniform solution. This solution is referred to as treating agent 1.

Surface Treating Agent Preparation Example 2

Succinic anhydride was reacted with a fluoropolymer having hydroxy groups (chlorotrifluoroethylene/ethyl vinyl ether/hydroxybutyl vinyl ether copolymer, hydroxyl value: 100 mgKOH/g) to modify a part of the hydroxyl groups to carboxyl groups (acid value of the fluoropolymer: 50 mgKOH/g, hydroxyl value: 50 mgKOH/g), and further, 70% of the carboxyl groups were neutralized with ammonia. To 100 parts by weight of treating agent 1, 0.5 part of this fluoropolymer was added and mixed to obtain a uniform solution. This solution is referred to as treating agent 2.

Surface Treating Agent Preparation Example 3

To 100 parts of treating agent 1, 0.2 part of γ-aminopropyltrimethoxysilane was added to obtain a uniform solution. This solution is referred to as treating agent 3.

Surface Treating Agent Preparation Example 4

10 parts of ethyl silicate 40, 50 parts of isopropanol, 0.5 part of concentrated hydrochloric acid and 10 parts of deionized water were mixed and reacted for two hours with stirring at 60°C. To this reaction solution, 200 parts of isopropanol and 230 parts of n-butanol were added and stirred to obtain a uniform solution. This solution is referred to as treating agent 4.

Surface Treating Agent Preparation Example 5

Two parts of an isopropyl alcohol solution of a copolymer of chlorotrifluoroethylene/undecenoic acid/ethyl vinyl ether/hydroxybutyl vinyl ether (molar ratio: 50/10/25/15) (solid content: 50 wt %) was added to 100 parts of the above treating agent 4 to obtain treating agent 5.

Preparation Example of test specimen

To 100 parts of a xylene solution of a fluoropolymer having hydroxyl groups (a copolymer of chlorotrifluoroethylene/cyclohexyl vinyl ether/ethyl vinyl ether/hydroxybutyl vinyl ether=50/15/25/10 mol %) (solid content: 60 wt %, hydroxyl value: 50), 18 parts of Coronate HX as a curing agent (an isocyanate type curing agent, manufactured by Nippon Polyurethane Industry Co. Ltd.), 25 parts of titanium oxide as a pigment, and 7 ppm, based on the resin, of dibutyltin dilaurate as a curing catalyst, were added and uniformly mixed to obtain a fluoropolymer coating material. This fluoropolymer coating material was coated on aluminum plates of 20 cm×60 cm and dried at room temperature for one week to obtain test specimens.

EXAMPLE 1 AND COMPARATIVE EXAMPLE 1

On the above test specimens, treating agents 1, 2, 3, 4 and 5 were respectively coated so that the dried film thickness would be from 1 to 2 μm and dried at room temperature for one day. The advance tension of the surface of the test specimen treated by treating agent 1 was 32.4 dyn/cm. The advance tension by treating agent 2 was 17.6 dyn/cm, the advance tension by treating agent 4 was 28.6 dyn/cm, the advance tension by treating agent 2 was 20.4 dyn/cm, and the advance tension by treating agent 5 was 21.3 dyn/cm. The advance tension of the surface of the test specimen on which no treating agent was coated, was −3.6 dyn/cm.

The treated test specimens and the untreated test specimen were bent and exposed outdoors in Kawasaki city so that their lower portions would be vertical (length: 30 cm), and the upper portions would be 30° from the horizontal plane (length: 30 cm). During the exposure, there were rain falls of at least 1 mm every time on an average of once a week.

With the test specimen on which no treating agent was coated (Comparative Example 1), rain streak soils formed on the vertical surface after three weeks. However, with the test specimen coated with treating agent 1, 2, 3 or 5 (Example 1), no rain streak soils formed even upon expiration of five months of exposure.

EXAMPLE 2

To 100 parts of ethyl silicate 40, 27 parts of an aqueous solution of 0.001 wt % nitric acid and 100 parts of ethanol were added, followed by hydrolysis at room temperature. To the obtained solution, 3,200 parts of a solvent composed of isopropanol/n-butanol/toluene=1/1/1 (weight ratio) and 0.1 part of acetylacetone were incorporated to obtain surface treating agent 6. This surface treating agent 6 was top-coated in a dry film thickness of from 2 to 5 μm on a part of a concrete outer wall coated with a fluoropolymer of an existing building, and then dried.

EXAMPLE 3

To 100 parts of surface treating agent 6 in Example 2, 100 parts of the following prepared solvent-soluble type fluoropolymer composition solution was added to obtain surface treating agent 7, which was top-coated in the same manner as in Example 2 on a part of a fluoropolymer-coated aluminum panel outer wall of an existing building and dried.

Solvent-soluble type fluoropolymer composition solution

Toluene solution of the following blend proportions (solid content: 2 wt %)

| | |
|---|---|
| Fluoropolymer used for the preparation of the test specimens | 100 parts |
| 3-glycidoxypropylmethyldimethoxysilane | 0.8 part |
| Tinuvin 1130 (Photostabilizer manufactured by Ciba | 3 parts |

-continued

| | |
|---|---|
| Geigy) | |
| CGL123 (Photostabilizer manufactured by Ciba Geigy) | 1.5parts |
| Aerosil T600 (Ultrafine powder synthetic silica, manufactured by Nippon Aerosil Co. Ltd.) | 3parts |
| Aluminum monoacetylacetonate bis(ethylacetoacetate) | 0.2parts |
| Coronate HX (isocyanate curing agent, manufactured by Nippon Polyurethane Industry Co. Ltd.) | 18parts |
| Mixture of toluene/butyl acetate = 4/3 (weight ratio) | 35parts |

EXAMPLE 4

Using a composition solution having Coronate HX (manufactured by Nippon Polyurethane Industry Co. Ltd.) and Aerosil T600 (manufactured by Nippon Aerosil Co. Ltd.) removed from the solvent-soluble type fluorine type resin composition solution used in the preparation of the surface treating agent 7 of Example 3 (solid content: 2 wt %), 100 parts of this solution was added to 100 parts of the surface treating agent 6 in Example 2 to obtain surface treating agent 8, which was top-coated in the same manner as in Example 2 on a part of a fluoropolymer coated ALC (light weight foamed concrete) outer wall, and dried.

Comparative Examples 2, 3 and 4

With respect to the outdoor articles in Examples 2, 3 and 4, portions which are not surface-treated by the surface treating agents, were evaluated.

The results of Examples 2 to 4 and Comparative Examples 2 to 4 were as follows. It is considered that due to the action of hydroxyl groups of the hydrolyzate of a compound having a hydrolyzable silyl group such as ethyl silicate 40, no rain streak soils were observed in Examples 2 to 4, and the minus value of ΔL became small. In the table, ΔL value represents a brightness change, and the larger the minus value, the more the formed rain streak soils.

TABLE 1

| | Rain streak soils | ΔL value upon expiration of three months |
|---|---|---|
| Example 2 | nil | −1 |
| Example 3 | nil | −1 |
| Example 4 | nil | −1 |
| Comparative Example 2 | positive | −2 |
| Comparative Example 3 | positive | −3 |
| Comparative Example 4 | positive | −4 |

INDUSTRIAL APPLICABILITY

By the treatment with the surface treating agent of the present invention, formation of streak soils which are likely to from at a portion where rain water collects and runs down, such as below a window frame of a building, can be prevented.

We claim:

1. A method for treating the surface of an outdoor article, comprising treating the coating film surface of an outdoor article having a hydrophobic synthetic resin coating film, with a surface treating agent containing silane compound (A) having a silanol group obtained by hydrolyzing an oligomer of a tetraalkoxysilane, wherein said oligomer of a tetraalkoxysilane has the formula RO{Si(OR)$_2$O}$_n$R, wherein R is an alkyl group, and n represents a number of the oligomerization degree and a synthetic resin fluoropolymer film-forming component (C), dissolved or dispersed in a medium (B), wherein the content of the silane compound (A) is from 0.01 to 100 parts by weight per 100 parts by weight of the medium (B).

2. The method according to claim 1, wherein the surface treating agent further contains an acid catalyst or a buffer (D).

3. The method according claim 1, wherein the medium (B) is an aqueous medium and the surface treating agent further contains a surfactant (E).

4. The method according to claim 1, wherein the hydrophobic synthetic resin coating film is a coating film of a fluoropolymer coating material.

5. An outdoor article having a film formed from a surface treating agent containing the following silane compound (A) and a synthetic resin fluoropolymer film-forming component (C), on the surface of the outdoor article, said surface of said outdoor article being a hydrophobic synthetic resin coating film, wherein the silane compound (A) is a silane compound having a silanol group obtained by hydrolyzing an oligomer of a tetraalkoxysilane wherein said oligomer of a tetraalkoxysilane has the formula RO{Si(OR)$_2$O}$_n$R, wherein R is an alkyl group, and n represents a number of the oligomerization degree.

6. The outdoor article according to claim 5, wherein the hydrophobic synthetic resin coating film is a coating film of a fluoropolymer coating material.

7. The outdoor article according to claim 5, wherein the film thickness of the film is from 0.01 to 50 μm.

8. The outdoor article according to claim 5, wherein the film formed from the surface treating agent is obtained by coating the hydrophobic synthetic resin coating film surface with a surface treating agent having the silane compound (A) and a synthetic resin fluoropolymer film-forming component (C), dissolved or dispersed in a medium (B), wherein the content of the silane compound (A) is from 0.01 to 100 parts by weight per 100 parts by weight of the medium (B), followed by drying said surface treating agent.

* * * * *